June 12, 1951     K. W. JACKSON     2,556,394
ILLUMINATED THERMOMETER
Filed Sept. 25, 1946     2 Sheets-Sheet 1
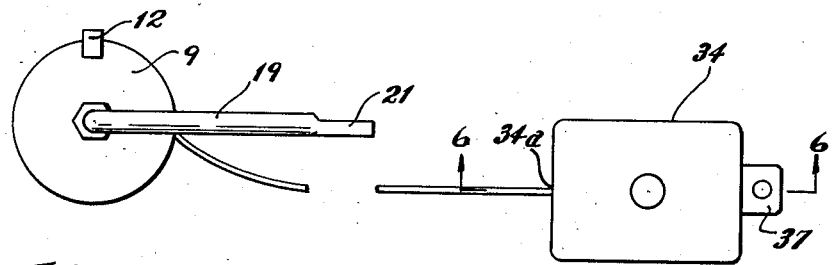
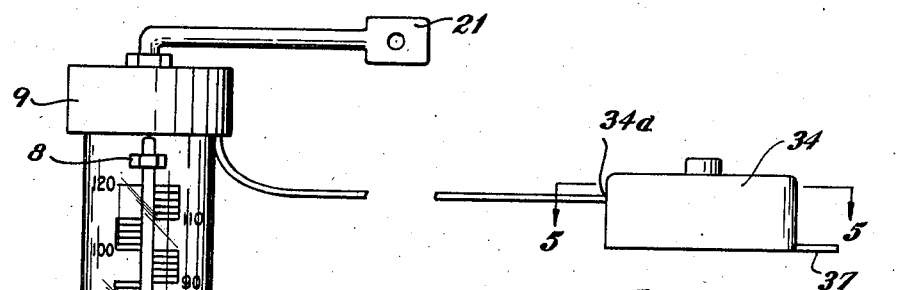
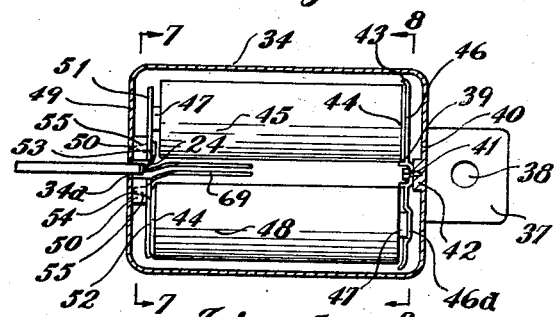
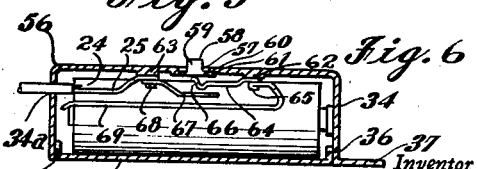
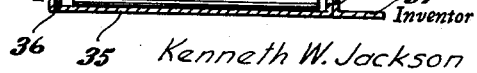
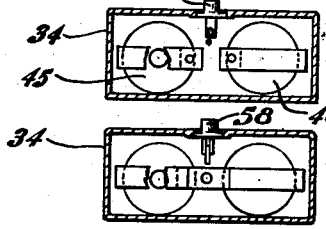
Inventor
Kenneth W. Jackson
By Clarence A. O'Brien
and Harvey B. Jackson
Attorneys June 12, 1951 K. W. JACKSON 2,556,394
ILLUMINATED THERMOMETER
Filed Sept. 25, 1946 2 Sheets-Sheet 2

Inventor
Kenneth W. Jackson

By *Clarence A. O'Brien*
and *Harvey B. Jackson*
Attorneys

Patented June 12, 1951

2,556,394

UNITED STATES PATENT OFFICE 2,556,394

ILLUMINATED THERMOMETER

Kenneth W. Jackson, Sherrill, N. Y.

Application September 25, 1946, Serial No. 699,291

4 Claims. (Cl. 73—378)

1

The present invention relates generally to a useful and improved means in thermometers and more specifically to a thermometer which can be illuminated and easily read at times when existing methods of illumination prove to be insufficient.

An important object of the invention is to provide a thermometer which can be attached to a conventional window frame on the outside of the frame and illuminated by a flashlight bulb mounted adjacent the thermometer.

Another object of the invention is to provide a switch which may be placed indoors for controlling the illumination of a thermometer supported out of doors.

A further object of the invention is to provide a simple, durable and inexpensive thermometer whereby the outside temperature may be read from the inside of a building under poorly lighted conditions.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the thermometer case with a bracket attached thereto.

Figure 2 is a front elevational view.

Figure 3 is a top plan view of the switch box for the illuminating lamp of the thermometer.

Figure 4 is a side elevational view thereof.

Figure 5 is a sectional view taken on a line 5—5 of Figure 4.

Figure 6 is a sectional view taken on a line 6—6 of Figure 3.

Figures 9, 10, 11:
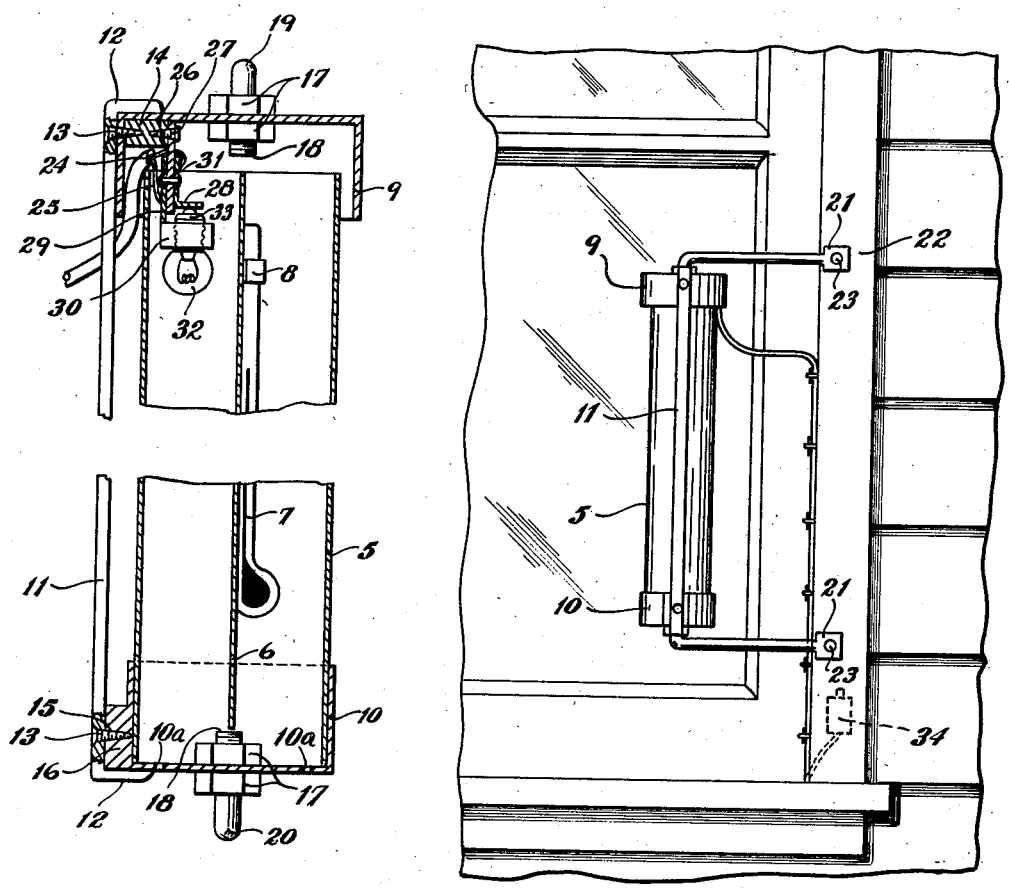

Figures 7 and 8 are sectional views taken respectively on the line 7—7 and 8—8 of Figure 5.

Figure 9 is a fragmentary vertical sectional view of the thermometer case.

Figure 10 is a rear elevational view of the thermometer attached to the outside of a window frame, and Figure 11 is a fragmentary perspective view of the upper end of the thermometer case.

Referring now to the drawings in detail wherein for the purpose of illustration I have disclosed a preferred embodiment of the invention the numeral 5 designates a clear cylindrical glass tube open at both ends and having a translucent thermometer scale 6 in the center thereof. A conventional mercury sealed tube 7 is attached to the scale by U-brackets 8 or other suitable attaching means.

At the upper and lower ends of the tube 5 are

2 placed an upper cap 9 and a lower cap 10 which are secured in vertically spaced relation with respect to each other by a rod 11 having inturned flanges 12 resting on the top and bottom of the caps 9 and 10 respectively. The rod 11 is secured to the caps 9 and 10 by screws 13, one of the screws also being used to secure a wooden block 14 in the other upper cap 9 and another of the screws being threaded into a bore 15 in the boss 16 formed on the outside of the lower cap 10. The cap 10 is provided with one or more ventilating openings 10a.

Extending inwardly through the center of the upper and lower caps and held thereto by nuts 17 are the threaded ends 18 of upper and lower brackets 19 and 20 whose outer ends are fastened to the outside of a window frame at 22 or other suitable supporting structure by screws 23.

The lower cap 10 is made to fit relatively tight on the lower end of the tube 5 and the upper cap 9 is constructed of an increased diameter to allow wires 24 and 25 to pass between the tube 5 and the cap and also to permit the free circulation of air into the upper end of the tube in order to obtain a proper temperature reading on the scale.

A vertical strip 26 of insulation material is attached to the block 14 by a screw 27, the strip extending downwardly from the block. Positioned at opposite sides of the vertical strip 26 is an angle conductor plate 28 and a conductor strip 29 having a flashlight socket 30 attached thereto so that the socket is suspended vertically behind the scale 6. The strip 29 and conductor plate 28 are connected to the strip 26 by a suitably insulated rivet 31 with the ends of the rivet upset. A conventional flashlight bulb 32 is screwed in the socket 30 so that the contact end 33 of the bulb comes in contact with the angle 28 as shown in Figure 9.

The ends of wires 24 and 25 are electrically connected in any suitable manner to conductor plate 28 and strip 29 respectively.

The inner surface of the tube in back of the scale 6 is painted to reflect light from the bulb through the scale.

The wires 24 and 25 extend from the tube 5 and are attached to the side of a window frame 22 as shown in Figure 10 and carried into the building and are then extended into a plastic or other switch case 34 of insulation material through a side opening 34a. The case 34 includes a base 35 having an inturned flange 36 for insertion into the top of the case which is frictionally held on the base. A hanger 37 is suitably attached to the base to hold the switch case fixed to a suitable supporting structure by a tack, screw or other suitable fastening device.

A resilient spring clamp 39 is held to the inner end 40 of the case by a screw 41 extending through the center of the clamp 39 and into a threaded hole in a boss 42 on the inner side 40 of the case. The resilient clamp 39 is so constructed with ends 43 turned up to hold a smooth end 44 of a battery 45 at one end 46 and the clamp has a bent-in recess 46a to hold the terminal 47 of a second battery 48 on the other end of said clamp as shown in Figure 5.

At the end 49 of the case and placed on both sides of openings 34a are a pair of bosses 50 which hold a pair of rigid clips 51 and 52 thereto by screws 53 and 54 placed into the threaded holes 55 in the bosses. Battery 45 is placed in the case so that its smooth end 44 rests against the clamp 39 and the terminal end 47 thereof rests against the clip 51. Battery 48 is placed oppositely to battery 45 so that its terminal end 47 rests in the recess 46a in clamp 39 and its smooth end 44 rests against clips 52 as shown in Figure 5.

The upper surface 56 of the case has a circular opening 57 through which extends the outer end 58 of a push-button 59 having flanges 60 which rest in a recess 61 and limit outward of the push-button. On the inner side of the top of the case and placed on both sides of openings 57 are a pair of bosses 62 and 63. A spring contact 64 is pressed to the boss 62 by a screw 65, said contact having an upwardly turned end 66 under the button 59. A stationary contact 67 is pressed to boss 63 by a screw 68 and extends under movable contact 64.

The wire 24 is attached to screw 53 and wire 25 is attached to screw 68. One end of a short piece of wire 69 is attached to screw 65 and the other end of said wire is attached to screw 54. As the push-button 59 is depressed contact 64 is forced downwardly to engage contact 67 to close the circuit with the bulb 32 for illuminating the scale 6 and when the push-button is released the bulb will remain de-energized.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim as my invention:

1. A thermometer of the class described comprising a translucent thermometer scale plate having a scale thereon, a mercury tube mounted to said scale plate, a transparent case for said scale plate and tube having open upper and lower ends, a cap fitting on the lower end of said case to close and support the same, a second cap surrounding the upper end of said case and spaced therefrom to admit air into said case to contact said tube, means rigidly connecting said caps to hold the second cap spaced from the upper end of said case with said case supported by the first named cap, a pair of brackets attached to said caps for fastening to a support to hold said case upright, and means for illuminating said case so that said scale may be read through said case.

2. A thermometer according to claim 1 wherein the first named means comprises a rod with end flanges attached to said caps.

3. A thermometer of the class described comprising a transparent thermometer scale plate having a scale thereon, a mercury tube mounted to said plate, a transparent case for said scale plate and tube having open upper and lower ends, a cap fitting on the lower end of said case to close and support the same, a second cap surrounding the upper end of said case and spaced therefrom to admit air into said case for contact with said tube, a rigid member connecting said caps to hold the second cap spaced from the upper end of said case with said case supported by the first named cap, a block fixed in said second cap, scale illuminating means in said case carried by said block, and means for attaching said caps to a support to hold said case upright.

4. A thermometer of the class described comprising a translucent thermometer scale plate having a scale thereon, a mercury tube mounted to said scale, a transparent case for said scale plate and tube having open upper and lower ends, a cap fitting on the lower end of said case to close and support the same, a second cap surrounding said upper end of said case and spaced therefrom to admit air to said case to contact said tube, a member rigidly connecting said caps to hold the second named caps spaced from said upper end of said case with the case supported by the first named cap, and means attached to at least one of said caps for fastening to a support to hold said case upright.

KENNETH W. JACKSON.

REFERENCES CITED

The following references are of record in the file of this patent:

UNITED STATES PATENTS

| Number | Name | Date |
|---|---|---|
| 1,005,829 | Gurley | Oct. 17, 1911 |
| 1,409,105 | Henze | Mar. 7, 1922 |
| 1,605,466 | Roedell | Nov. 2, 1926 |
| 1,750,422 | Noyes, Jr. | Mar. 11, 1930 |
| 1,909,708 | Neuwirth | May 16, 1933 |
| 2,303,121 | Hartness | Nov. 24, 1942 |

FOREIGN PATENTS

| Number | Country | Date |
|---|---|---|
| 209,290 | Great Britain | Jan. 10, 1924 |